(No Model.)
D. SHORTSLEEVE.
MACHINE FOR FEEDING SAND AND WATER TO STONE SAWING MACHINES.
No. 331,562. Patented Dec. 1, 1885.
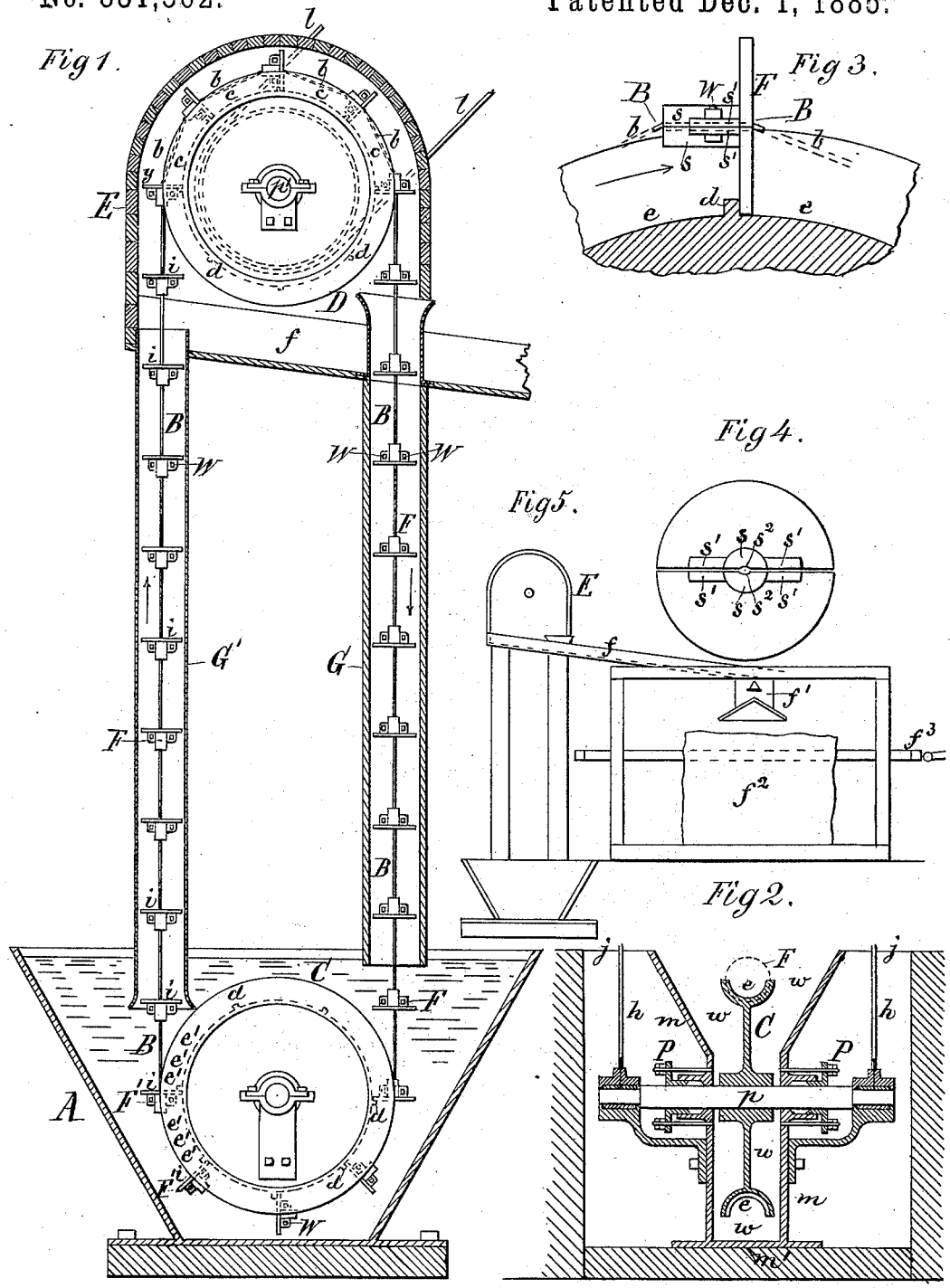
Witnesses:
J. F. Theo. Lang
R. Lincoln Fenwick
Inventor:
David Shortsleeve
by his atty,
Fenwick & Lawrence

UNITED STATES PATENT OFFICE.

DAVID SHORTSLEEVE, OF RUTLAND, VERMONT, ASSIGNOR TO EDMUND A. MORSE, OF SAME PLACE.

MACHINE FOR FEEDING SAND AND WATER TO STONE-SAWING MACHINES.

SPECIFICATION forming part of Letters Patent No. 331,562, dated December 1, 1885.

Application filed March 25, 1885. Serial No. 160,073. (No model.)

*To all whom it may concern:*

Be it known that I, DAVID SHORTSLEEVE, a citizen of the United States, residing at Rutland, in the county of Rutland and State of Vermont, have invented certain new and useful Improvements in Machines for Feeding Sand and Water to Stone-Sawing Machines; and I do hereby declare the following to be a full, clear, and exact description of the same, reference being had to the annexed drawings, in which—

Figure 1 is mainly a vertical longitudinal central section of my improved machine for feeding sand and other materials with water to sawing-machines, rubbing-beds, and gritting-machines; Fig. 2, a vertical central cross-section of the lower sheave and the receiving-box into which the sand and water are placed; Fig. 3, a detail sectional enlarged view of the upper portion of the driving sheave or pulley of the machine, a portion of the endless rope with a lifter being shown. Fig. 4 is a plan view of one of the circular lifters before its parts are clamped together employed to elevate from the receiving-box of the machine the sand or other material mixed with water to be fed to sawing-machines, rubbing-beds, and gritting-machines. Fig. 5 is a diagram signifying my said improved machine in working relation to a machine for sawing stone.

The object of my invention is the production of a simple, inexpensive, but effective machine for the purpose set forth, which shall avoid the destructive wear incident to the employment of a pump for elevating the sand and other material mixed with water, and whereby, while an endless rope or chain of lifters is used for raising the sand and other material mixed with water, the rope or chain shall be protected from extraordinary wear, and the circular lifters employed be so constructed with reference to the endless rope or chain as to be readily removed therefrom and their place supplied with other like lifters, as well as be capable of adjustment on the rope when necessary, and which lifters while in action shall serve to keep up within the "receiving-box" a proper circulation of the sand and other material mixed with water contained therein, as well as perform their main function of raising the sand mixed with water; and my invention consists in certain constructions, arrangements, and combinations of parts, as hereinafter described and specifically claimed.

In the drawings, A indicates the receiving-box, in which is placed the sand or other substance and water; B, the endless wire rope supplied with a spaced series of lifters for elevating the sand and water from the receiving-box; C, the lower continuously-grooved sheave, beneath and around the periphery of which the endless rope or chain B passes; D, the upper continuously-grooved sheave, above and around the periphery of which the endless rope B passes; E, the housing which, as shown, incloses the sheave D and upper portion of the endless rope B, which rope is supplied with circular lifters F, which when the rope is operated in the direction of the arrows take upon their plane-faced surfaces sand mingled with water from the receiving-box A and deliver the same upon the trough $f$, from which it is discharged upon one or more distributers, $f'$, of a stone-sawing machine, as indicated in Fig. 5, and thence passes upon the stone, $f^2$, being sawed by the gang of saws $f^3$.

The lifters F, as clearly shown in Fig. 1, are spaced a given distance apart throughout the length of the endless rope B, to correspond with the distance apart at which the offsets $d$ are made to project from the bottom of the endless groove $e$, and such spacing both of the "lifters" and the "offsets" is such that when a number of the lifters F—five, for example, as shown—are at their peripheries seated in the continuous groove $e$ of the sheaves C and D, as in Fig. 1, the rope B, as indicated in dotted lines at $b\ b\ b\ b$ in Fig. 1, will extend from lifter to lifter between the lifters which are in contact with the said sheaves without touching the sheaves, and hence will not become worn and damaged by frictional contact therewith. By dotted lines in Fig. 2 and by solid lines in Fig. 3, one of the lifters F is shown in position in the continuous groove $e$ of the said sheaves C and D, the lifter being made of such size that a portion of its periphery will be snugly seated in the groove when the lifters are in working position, as indicated in Figs. 1, 2, and 3, and when a number of the same—five, for example—are in position in the groove $e$, as indicated in connection with the sheave D in Fig. 1, a trough, as at *c c c c*, will be formed, as shown, between the respective five lifters, which will hold any surplus sand or other material mixed with water which has not been thrown off or discharged from the lifters and passed into the trough *f*, as will be presently described. Thus the endless trough *e* of the said sheaves serves to give steady action to the lifters, retain the lifters in due position upon the sheaves, form troughs on the sheave D for holding undischarged sand mingled with water, and delivering the same into the guide-tube G, extending through the trough *f*, and whence the sand is redelivered into the receiving-box A down through the tube G, and this without the waste of the sand or scattering it on the machine or elsewhere during its transportation from the receiving-box A.
As shown clearly in Fig. 1, the tube G, at its top, is made bell-muzzle, thus facilitating the entrance of the lifters therein as they pass from off the sheave D, as well as insuring the entrance of sand or other substance mingled with water from the troughs *c c c c* of said sheave. And, again, with reference to the lower sheave, C, the position of its lifters in its groove *e* is such that when one of said lifters has attained the position of that which is lettered F' there will be formed at *e' e' e'* a receptacle, within which the sand in circulation in the receiving-box will be more surely collected, and so, as the lifters pass on upwardly into the tube G', the sand will finally be settled and collected upon the face-surface *i* of said lifters and be elevated to and discharged from the top of the tube G'. This tube, which at its lower end is also made bell-muzzle, as shown, terminates above the bed-surface of the spout *f*, and thus any sand and water discharged from the working-face *i* of the lifters F will pass down the trough to the sawing-machine, Fig. 5, without falling back through the tube G. The endless chain or wire rope F, as the case may be, (the wire rope preferred,) it will be seen, occupies a central position within the said tube, and the peripheries of the lifters are entirely free from contact with said tubes, and thus on the upward movement of the endless wire rope any drip from the face *i* of the lifters can freely pass back into the receiving-box. This receiving-box, in a longitudinal direction, is of contracted dimensions, as shown, and made to form a water-tight receptacle, *w*, within which sand, "shot," or other materials and water are placed. This box may be located in the ground-floor of the building in which it is used, and set into the floor with the ends level to the drainage, the sides projecting above the ends as much as is desired. This receiving-box, in fact, is a box in a box, or a box in a pit, arranged so as to allow the bearings of the sheave C, as shown in Fig. 2, to be located outside of the water-tight receptacle *w*, and thus prevent the grit from getting into the bearings. In this outside box are perpendicular capped tubes or pipes *h*, fastened to the journals, as shown, so that the journals may be oiled without taking off the cover from the outside box or pit, said outside box being open, as at *j j*, to give convenient access to the packing-boxes P P of the shaft *p* of the sheave C. Thus constructed, the sheave C is walled in by the walls *m m* and bottom *m'* of the inner box, and into the space *w* of which the sand and water is placed or fed, as the case may be, and from which the water cannot leak out through the stuffing-box P, but may overflow at the ends of the receiving-box into the drain, on the line of which it may be set.

When in operation the lifters F have their movement from end to end, as it were, of the receiving-box A through the contracted space *w*, which immediately contains the sand and other substances and water, and thus during the revolutions of the sheave C said lifters act as thorough stirrers or agitators in the receiving-box, causing all the muddy water and refuse to pass off with the overflow, while the greater gravity of the sand or shot causes the same to be retained within the space *w*.

The endless rope B, as indicated in Fig. 1, is driven by a belt, *l*, properly applied to the sheave D, and so as to be operated in the direction indicated by the arrows in said figure, and such of the lifters F as may be traveling up the tube G' will be loaded on their face-surfaces *i* with sand, &c., from the box A. At the point *x* in Fig. 1 one of these loaded lifters is represented as having just emerged from the tube G', and preceding it at the point *y* a lifter has just come in contact with the sheave D in the groove *e* thereof. This contact, in the nature of a tap, of the sheave against the lifter will tend to slightly tip it outwardly from the sheave, and at the same instant will shake or vibrate the rope B at and a little below the point of contact sufficient to dislodge or shake off the load from its face *i* and discharge it into the trough *f*, from whence it is, by the inclination of the trough, passed on to a sawing-machine, as in Fig. 5, or such other machines in which it may be wanted for use. Practically the space between the lifters F as they ascend the tube G will be more or less filled with sand, and water also, so that as the lifters emerge from said tube the flowing off of the water into the trough *f* will act as auxiliary to the tapping of the lifters and shaking of the same above described to effect the discharge of the sand from the lifters.

The axis or shaft *p'* of the sheave D may have its bearings in any proper manner in the housing E, and the sheave D being rotated in the direction of the arrow in Fig. 3, the spaced offsets *d* coming in contact with the lifters in rear thereof, as shown, forces the endless rope B with its lifters to be revolved, as indicated.

In Figs. 3 and 4 an enlarged view of one of the lifters employed is shown. They are made in two parts or halves, each of which is formed with a shank, s, and a flange, as s', on either side of the shank, as shown, while an oblong central groove, as $s^2$, is made, within which to clamp the wire rope B by the bolt and screw-nuts W, as indicated in Fig. 3. By these means I am enabled to firmly fix the lifters F in any desired place on the rope or remove the same therefrom when required, or when a new lifter may be required to be supplied in place of one which may have been injured. Thus the lifters are not only removable, but may be adjusted nearer together or farther apart upon the rope, according as it is desirable to feed the sand and other substance from the box A to the trough f more or less rapidly, care being taken not to space the lifters so far apart as to cause the rope to come in contact with the sheaves C and D when passing over the same.

I would observe that the sand or other substance and water after being used by the machine to which it is supplied is made to drain back to the receiving-box A, and is continually used over and over again as long as it is desirable, and the receiving-trough f is so arranged that the sand or other substance and water can be run to one or more machines by means of feed-gates in discharging-troughs, so that one sand-elevating machine can be used to supply a number of machines.

What I claim as my invention, and desire to secure by Letters Patent, is—

1. The endless rope B, provided with lifters F, having shanks s, flanges s', and plane working-face i, and tightening bolt and nut, in combination with tubes G G' and sheaves C and D, substantially as and for the purpose described.

2. The receiving-box A, composed of an inner water-tight sand and water receptacle having a containing-space, w, for the sand and water to be fed, and an outward inclosing chamber for the bearings and packing-boxes P P of a sheave-shaft, p, substantially as and for the purpose described.

DAVID SHORTSLEEVE.

Witnesses:
ROBT. ROSS,
C. CLARK.